United States Patent [19]

Momose

[11] Patent Number: 5,457,631
[45] Date of Patent: Oct. 10, 1995

[54] METHOD AND APPARATUS FOR CORRECTING THE ZERO PRESSURE VALUE OF A HYDRAULIC POWER STEERING PRESSURE SENSOR

[75] Inventor: Nobuo Momose, Okazaki, Japan

[73] Assignee: Mitsubishi Jidosha Kogyo Kabushiki Kaisha, Tokyo, Japan

[21] Appl. No.: 694

[22] Filed: Jan. 5, 1993

[30] Foreign Application Priority Data

Jan. 28, 1992 [JP] Japan .................. 4-012866

[51] Int. Cl.⁶ ............... B62D 5/00; F15B 1/027
[52] U.S. Cl. ............ 364/424.05; 364/558; 364/571.01; 180/79.1; 180/132; 73/4 R
[58] Field of Search .................. 364/424.05, 426.01, 364/551.01, 558, 571.01; 180/140, 141, 142, 148, 79.1, 132; 280/91, 419; 74/388 PS; 73/4 R, 39, 708; 91/452

[56] References Cited

U.S. PATENT DOCUMENTS

| | | | |
|---|---|---|---|
| 4,193,471 | 3/1980 | Lang | 180/154 |
| 4,574,589 | 3/1986 | Hasegawa et al. | 73/4 R |
| 4,618,017 | 10/1986 | Liebert et al. | 180/143 |
| 4,623,031 | 11/1986 | Drutchas et al. | 180/142 |
| 4,803,629 | 2/1989 | Noto et al. | 364/424.05 |
| 5,018,594 | 5/1991 | Takahashi et al. | 180/140 |
| 5,121,322 | 6/1992 | Shiraishi et al. | 364/424.05 |
| 5,147,007 | 9/1992 | Kahrs et al. | 280/91 |
| 5,184,693 | 2/1993 | Miller | 180/143 |
| 5,203,420 | 4/1993 | Shiraishi | 180/79.1 |
| 5,229,317 | 5/1993 | Schnelle | 180/132 |

Primary Examiner—Kevin J. Teska
Assistant Examiner—Tan Q. Nguyen

[57] ABSTRACT

A method and apparatus for correcting the zero pressure value of a hydraulic power steering pressure sensor. A power steering pressure PK is detected through pressure sensors 9 and 10 of a power steering cylinder 1 after an engine 14 stops running. The number of detections D [PK] of the power steering pressure PK is added up, provided that the power steering pressure PK remains unchanged for a predetermined time period, and then after a predetermined period passes after the engine has stopped running, the power steering pressure PK, at which the number of detections D [PK] reaches a maximum value, is adopted as the zero pressure value of the pressure sensors. This makes it possible to accurately correct the zero pressure value of the pressure sensors in the hydraulic power steering unit.

14 Claims, 3 Drawing Sheets

METHOD AND APPARATUS FOR CORRECTING THE ZERO PRESSURE VALUE OF A HYDRAULIC POWER STEERING PRESSURE SENSOR

BACKGROUND OF THE INVENTION

The present invention relates to a method for correcting the zero pressure value of a hydraulic power steering pressure sensor, to permit accurate detection of a working pressure of a hydraulic power steering unit.

As disclosed in Japanese Utility Model Provisional Publication No. H2-85675 (U.S. Pat. No. 5,018,594, DE3942494, GB2228460), a method for detecting the neutral point of a steering wheel by utilizing a working pressure of a hydraulic power steering unit is conventionally known. The present inventor has already proposed, under Application Number H3-325888, a method for estimating the neutral point of a steering wheel by taking a car speed and a steering wheel angle into account in addition to the working pressure, i.e., the power steering pressure of the hydraulic power steering unit.

Such a method is based on the assumption that the working pressure of the power steering unit is accurately detected. However, it should be noted that the output characteristics of pressure sensors, which detect the power steering pressure, may vary among different pressure sensors and may also vary due to changes in the environments wherein the sensors are used, or may vary due to other factors. In such a case, a discrepancy occurs between an actual value on the pressure sensor and the rated value. Further, the sensor value of the pressure sensor fails to indicate a zero pressure value even when the hydraulic power steering is not in operation.

Under such a circumstance, the neutral point of the steering wheel, which is estimated according to the aforementioned method, is inaccurate. This leads to a deficiency in that the tracing control of a traction control system or the rear-wheel steering control based on the estimated neutral point cannot be performed with high accuracy.

OBJECT AND SUMMARY OF THE INVENTION

An object of the present invention is to provide a method and apparatus for correcting the zero pressure value of a hydraulic power steering pressure sensor, to permit accurate correction of the zero pressure value of a pressure sensor, to thereby enable accurate detection of the working pressure of a hydraulic power steering unit.

This and other objects of the present invention are fulfilled by providing a method for correcting the zero pressure value of a hydraulic power steering pressure sensor used for a vehicle having a pressure sensor for detecting the working pressure of a hydraulic power steering unit. The method comprises the steps of a condition judgment step, for determining whether a condition, wherein the pressure detected through the pressure sensor remains unchanged for a specified time after an engine stops running, is established; a frequency detection step for determining with which of a plurality of preset pressures the working pressure detected each time it is determined that the condition is established in the condition judgment step coincides, and detecting the number of coincidences between the detected working pressures and the plurality of preset pressures for each preset pressure; and a correction step for setting a pressure value, which corresponds to a preset pressure at which the number of detections reaches a maximum value, as the zero pressure value of said pressure sensors after a specified time elapses from the moment the engine stops running, thereby correcting the zero pressure value of the pressure sensor.

According to the method of the present invention, the working pressure of the power steering is detected after the engine stops running. Further, the number of detections of the working pressure is incremented when the working pressure remains unchanged for a specified time. Also, the working pressure, at which the number of detections reaches the maximum value, is adopted as the zero pressure value of the pressure sensor after a specified time has passed from the moment the engine stopped running. This makes it possible to obtain excellent effects. As a typical effect, the zero pressure value can be corrected to an accurate value each time the engine stops running, and the accurate value can be maintained.

Further, in the method according to the present invention, more accurate correction can be performed by rendering the condition judgment valid only when a steering wheel angular velocity is a specified value or less.

Additionally, in the method according to the present invention, the capacity of a memory for storing the number of detections for each working pressure to be detected can be reduced with resultant improved efficiency by rendering the condition judgment valid only when the working pressure is a specified pressure level or less.

Other characteristics and advantages of the present invention will be made apparent from the following detailed description of an embodiment explained in connection with the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limit of the present invention and wherein.

DETAILED DESCRIPTION

The following describes an embodiment of the present invention with reference to the accompanying drawings.

Figure 2:
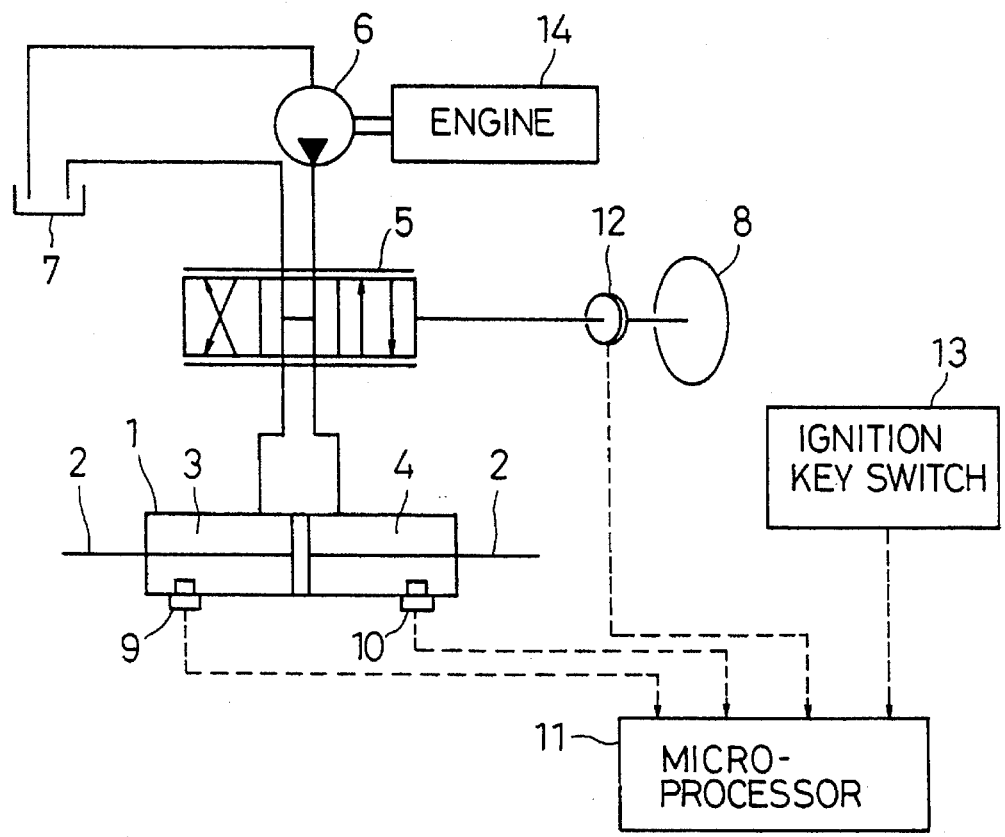
FIG. 2 is a schematic diagram showing a power steering system.

Referring to FIG. 2, a hydraulic power steering system of a vehicle is shown. This hydraulic power steering system is equipped with a power cylinder 1 consisting of a hydraulic cylinder. Both piston rods 2 of the power cylinder 1 are arranged to be connected to the right and left front wheels although they are not shown.

Inside, the power cylinder 1 has a pair of pressure chambers 3 and 4. These pressure chambers 3 and 4 are connected to an oil pump 6 and an oil reservoir 7 via a control valve 5. The oil pump 6 can be driven by an engine 14.

The control valve 5 is composed of a 4-port, 3-position directional control valve with a throttle, which is built in a steering column. This control valve 5 is operated to switch, when a steering wheel 8 is operated, one pressure chamber, corresponding to the steering direction, so that it is connected to the oil pump 6 to supply oil pressure to the pressure chamber, such that the other pressure chamber is connected to the oil reservoir 7. Accordingly, the power cylinder 1 operates to assist the operating power as the steering wheel 8 is operated.

The pressure chambers 3 and 4 incorporate pressure sensors 9 and 10. These pressure sensors 9 and 10 detect the pressures of the corresponding pressure chambers with a resolution of 1 kg/cm2, and supply the sensor signals to a single-chip microprocessor 11, for example. The microprocessor 11, to be discussed in detail, is capable of determining a zero pressure value of the working pressure (power steering pressure) of the power steering unit in accordance with pressure sensor values. The microprocessor is provided with arrays for accumulatively storing the number of detections of power steering pressure for each specified power steering pressure range. This number is used for determining the zero pressure value. The arrays are composed, for instance, of specified memory areas set in a memory of the microprocessor 11.

Further, electrically connected to the microprocessor 11 are a steering wheel angle sensor 12 and an ignition key switch 13. The steering wheel angle sensor 12 is a photo-interrupter type digital sensor which is attached to a steering shaft. The steering wheel angle sensor 12 detects steering wheel angles with a resolution of 1 degree, for example, and supplies the sensor signals to the microprocessor 11.

On the other hand, the ignition key switch 13 supplies an ON signal to the microprocessor 11 while the engine 14 is in operation. It further supplies an OFF signal to the microprocessor 11 when the operation of the engine 14 is stopped.

Figure 3:
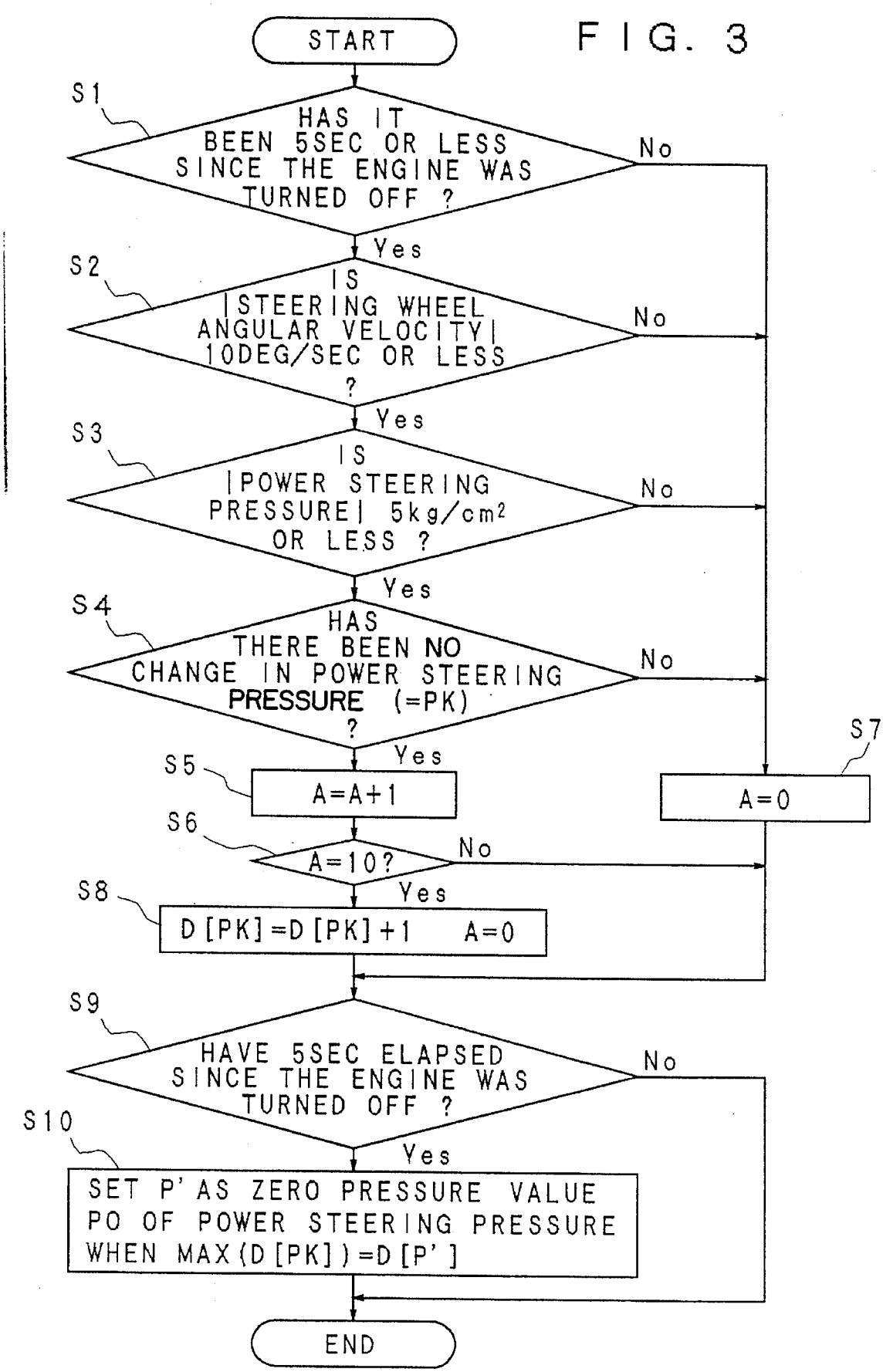
FIG. 3 is a flowchart showing a zero pressure value correcting routine.

The microprocessor 11 is designed to run a zero pressure value correcting routine for the power steering pressure shown in FIG. 3. The following describes the zero pressure value correcting routine.

The zero pressure value correcting routine is repeatedly executed at intervals of, for example, a 10 msec cycle. First, the microprocessor judges whether the time elapsed is 5 sec or less after the engine 14 stops running (step S1). To perform the judgment, a timer incorporated in the microprocessor 11 is used, and the operation of the timer is started from the moment the microprocessor 11 receives the OFF signal from the ignition key switch 13. Therefore, it is judged whether or not the value of the timer is 5 sec or less in the step S1.

If the judgment result of the step S1 is positive (YES), then the microprocessor further judges whether the absolute value of the steering wheel angular velocity is 10 deg/sec or less (step S2). For this judgment, a steering wheel angle $\theta H$ obtained through the steering wheel angle sensor 12 is used. More specifically, the microprocessor 11 determines the steering wheel angular velocity from a difference between a steering wheel angle $\theta H(n-1)$, which was detected when the routine was previously implemented, and a steering wheel angle $\theta H(n)$, which is detected when the routine is now implemented, and then compares the absolute value of the steering wheel angular velocity $|(\theta H(n)-\theta H(n-1))/10\ msec|$ with 10 deg/sec, thus performing the judgment in the step S2.

If the judgment result in this step is also positive, then the microprocessor judges whether the absolute value of the working pressure (power steering pressure) of the power steering unit is 5 kg/cm2 or less (step S3). For this judgment, the pressures detected through the above-mentioned pressure sensors 9 and 10 are used. To be specific, when the microprocessor 11 receives the pressures PL and PR detected through the pressure sensors 9 and 10, it calculates the power steering pressure PK from the difference between these pressures PL and PR. It then compares the absolute value |PK| of the power steering pressure with 5 kg/cm2, thus performing the judgment in the step S3.

Further, if the judgment result in the step is positive, then the microprocessor judges whether there has been no change in the power steering pressure PK (step S4). In this step, it is judged whether a power steering pressure PK(n-1), obtained when the routine was previously implemented, agrees with a power steering pressure PK(n) calculated in the present routine.

The program proceeds from the step S4 to a step S5, only if the judgment results of the aforesaid steps S1 through S4 are all positive. In the step S5, the value of a counter A is incremented by 1, and then it is judged whether the value of the counter A has reached 10 (step S6). If, however, any of the judgment results of the step S1 through the step S4 is negative, then the value of the counter A is reset to 0 in a step S7. More specifically, the value of the counter A is reset to 0 if the steering wheel 8 is being operated or if the power steering pressure of the power steering unit is higher than 5 kg/cm2 or has changed.

On the other hand, if the judgment result of the step S6 is negative, the program bypasses the step S8 and proceeds to a step S9 wherein the microprocessor judges whether 5 sec has elapsed since the engine 14 stopped running. If the judgment result in this step is also negative, then the microprocessor bypasses a step S10 and terminates the execution of the routine.

If the judgment result of the step S6 becomes positive in the course of the repetition of the aforesaid routine, that is, if all the judgment results of the step S1 through the step S4 are positive and if this condition is maintained for a specified time, i.e., 100 msec, then the step S8 is executed. In other words, the step S8 is not implemented until the routine of FIG. 3 has been repeated 10 times with all the judgment results from the step S1 through the step S4 being positive.

In the step S8, the value of an array corresponding to the power steering pressure PK obtained from the routine implemented this time, i.e., an array D [PK], is incremented by 1 as shown in the following equation, and the value of the counter A is reset to 0:

$$D\ [PK] = D\ [PK] + .$$

In this case, the value which the power steering pressure PK may take is an integral value of pressure ranging from −5 kg/cm2 to 5 kg/cm2, as is obvious from the detection resolution of the aforesaid pressure sensors 9 and 10. Thus, the number of necessary arrays D [PK] is 11.

Figure 4:
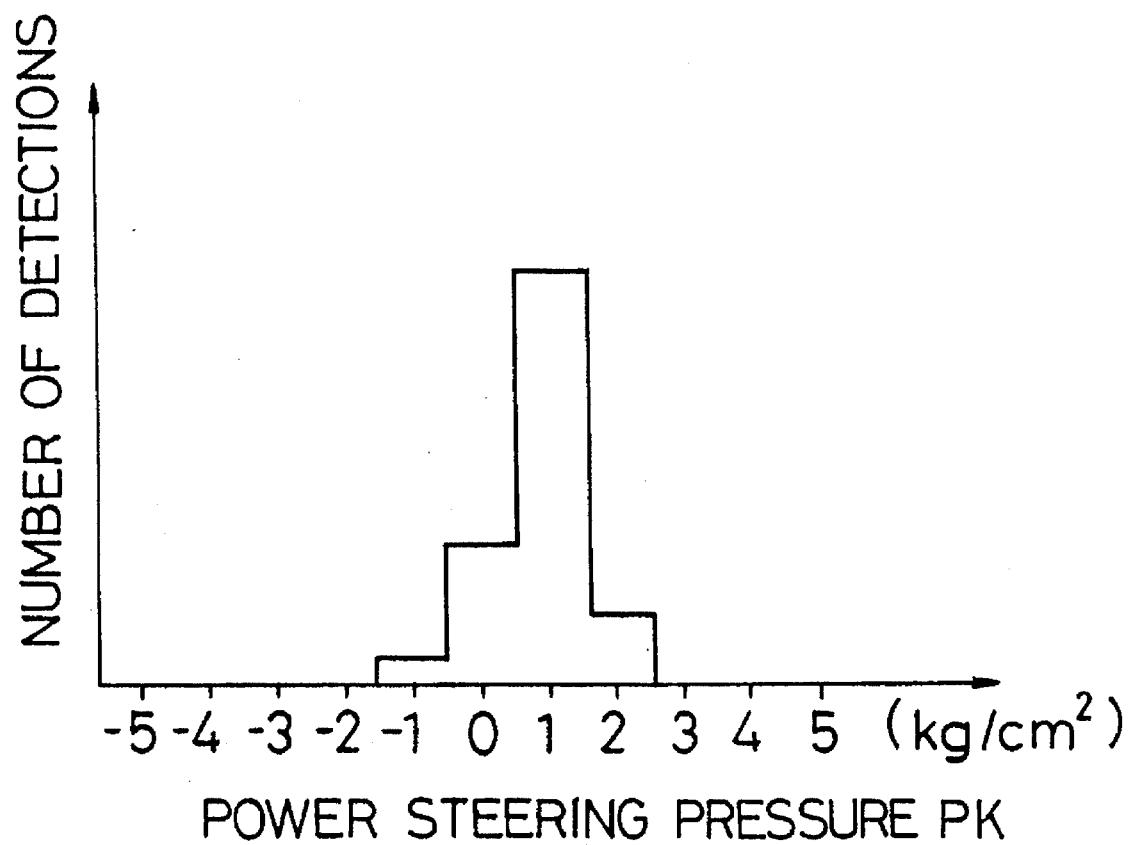
FIG. 4 is a graph showing the number of detections with respect to power steering pressures PK, each of which indicates the zero pressure value.

Accordingly, when the routine of FIG. 3 is repeatedly executed, each time the judgment result of the step S6 becomes positive, the value of an array D [PK] is incremented by 1. As a result, the data indicating the number of detections for each power steering pressure PK as shown in FIG. 4 are acquired in the memory of the microprocessor 11.

When the judgment result of the step S9 is positive, that is, when 5 sec has passed since the engine 14 stopped running, the step S10 is implemented for the first time. In this step S10, an array D [P'], at which the value reaches the maximum value among the arrays D [PK], is extracted. Further, the power steering pressure P' shown by the array is adopted as the zero pressure value P0 of the power steering pressure. For example, when the data shown in FIG. 4 are available, the array extracted will be D [1 kg/cm2] and the zero pressure value of the power steering pressure will be set at 1 kg/cm2.

Figure 1:
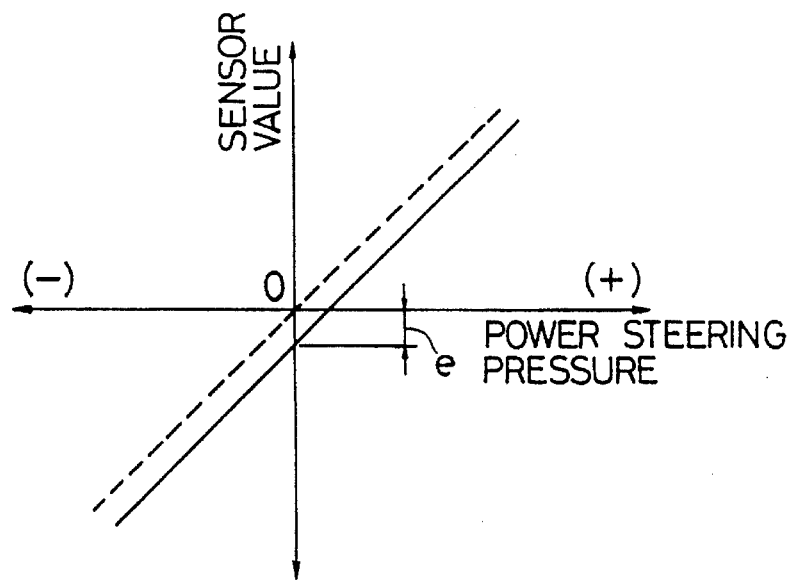
FIG. 1 is a graph showing the sensor values of a pressure sensor with respect to power steering pressure.

Incidentally, an inconvenience may take place wherein the discrepancy (indicated by a symbol "e" in FIG. 1) between the actual values and the rated values (shown by a solid line and a dotted line, respectively, in FIG. 1) of the pressure sensors causes the sensor values of the pressure sensors to fail to indicate the zero pressure value even if the hydraulic power steering is not in operation, thus preventing accurate detection of the power steering pressure. Such an inconvenience can be solved according to this embodiment.

The present invention is not limited to the embodiment described above, and various modifications thereof may be made. For instance, the routine of FIG. 3 is designed to be repeatedly implemented until 5 sec elapses after the engine 14 stops running. However, the time is not limited to 5 sec. Likewise, the number of implementations of the routine for performing the judgment in the step S6 is not limited to 10. This length of time period and the number of implementations may be properly set according to the capacity of the memory of the microprocessor 11. In addition, the aforesaid zero pressure value correcting routine may be separately carried out for the detected values of each of the pressure sensors 9 and 10.

The invention being thus described, it will be obvious that the same may be varied in many additional ways, such variations are not to be regarded as a departure from the spirit and scope of the invention, and all such modifications as would be obvious to one skilled in the art are intended to be included within the scope of the following claims.

What is claimed is:

1. A method for correcting zero pressure value of a hydraulic power steering pressure sensor used for a vehicle having a pressure sensor for detecting a working pressure of a hydraulic power steering unit, the method comprising the steps of:

(a) determining whether the working pressure, detected through the pressure sensor, has remained unchanged for a predetermined time period after an engine of the vehicle stops running;

(b) determining coincidence between each of a plurality of predetermined pressures and the working pressure detected, a coincidence being determined each time the working pressure is determined to be equal to one of the plurality of predetermined pressures in response to each positive determination in step (a), and detecting a number of coincidences between the detected working pressures and each of the plurality of predetermined pressures, for each predetermined pressure; and (c) setting the zero pressure value of the pressure sensor to the one of the plurality of predetermined pressures for which the number of coincidence detections is maximum, after a predetermined time period has elapsed from the time the engine stops running, to thereby correct the zero pressure value of the pressure sensor.

2. The method of claim 1, wherein said step (a) includes a substep of determining whether a steering wheel is moving, to thereby render a positive determination only if a detected steering wheel angular velocity is less than or equal to a predetermined value.

3. The method of claim 1, wherein said step (a) includes a substep of determining whether the detected working pressure is sufficiently low, to thereby render a positive determination only if the working pressure is less than or equal to a predetermined pressure.

4. The method of claim 1, wherein said step (b) includes the substep of incrementing a coincidence count of an array corresponding to the working pressure detected, among a plurality of arrays, one array corresponding to each of the plurality of predetermined pressures, for each of the plurality of predetermined pressures within a predetermined range of the working pressure.

5. The method of claim 4, wherein the number of the arrays is pre-established in accordance with the predetermined range and an incremental resolution of the pressure sensor.

6. The method of claim 1, wherein the pressure sensor includes a pair of pressure sensors, one in each of right and left pressure chambers of the hydraulic power steering unit, and a difference between detected pressures of the pair of pressure sensors is used as the detected working pressure.

7. The method of claim 1, wherein said step (a) includes detecting that the engine has stopped by detecting a turning OFF of an ignition key switch of the vehicle.

8. An apparatus for correcting zero pressure value of a hydraulic power steering pressure sensor used for a vehicle having a pressure sensor for detecting working pressure of a hydraulic power steering unit, the apparatus comprising:

first means for determining whether the working pressure, detected through the pressure sensor, has remained unchanged for a predetermined time period after an engine of the vehicle stops running;

second means for determining coincidence between each of a plurality of predetermined pressures and the working pressure detected, a coincidence being determined each time the working pressure is determined to be equal to one of the plurality of predetermined pressures in response to each positive determination by the first means, and for detecting a number of coincidences between the detected working pressures and each of the plurality of predetermined pressures, for each predetermined pressure; and third means for setting the zero pressure value of the pressure sensor to the one of the plurality of predetermined pressures for which the number of coincidence detections is maximum, after a predetermined time period has elapsed from the time the engine stops running, to thereby correct the zero pressure value of the pressure sensor.

9. The apparatus of claim 8, wherein said first means includes a non-steering judgment means for determining whether a steering wheel is moving, to thereby render a positive determination only if a detected steering wheel angular velocity is less than or equal to a predetermined value.

10. The apparatus of claim 8, wherein said first means includes a low-pressure judgment means for determining whether the detected working pressure is sufficiently low to thereby render a positive determination only if the working pressure is less than or equal to a predetermined pressure.

11. The apparatus of claim 8, wherein said second means includes means for incrementing a coincidence count of an array of the one of the plurality of predetermined pressures corresponding to the working pressure detected, among a plurality of arrays, one array corresponding to each of the plurality of predetermined pressures, and for accumulating the number of coincidence detections for each of the plurality of predetermined pressures within a predetermined range of the working pressure.

12. The apparatus of claim 11, wherein the number of arrays is pre-established in accordance with the predetermined range and an incremental resolution of the pressure sensor.

13. The apparatus of claim 8, wherein the pressure sensor includes a pair of pressure sensors, one in each of the right and left pressure chambers of the hydraulic power steering unit, and a difference between detected pressures of the pair of pressure sensors is used as the detected working pressure by the second means.

14. The apparatus of claim 8, wherein said first means includes means for detecting that the engine has stopped by detecting a turning OFF of an ignition key switch of the vehicle.

* * * * *